(12) United States Patent
Ueno (10) Patent No.: US 9,971,290 B2
(45) Date of Patent: May 15, 2018

(54) IMAGE FORMING APPARATUS AND PATTERN READING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Sueo Ueno, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/256,906

(22) Filed: Sep. 6, 2016

(65) Prior Publication Data

US 2018/0067436 A1 Mar. 8, 2018

(51) Int. Cl.
| | |
|---|---|
| *G03G 15/00* | (2006.01) |
| *G06K 5/00* | (2006.01) |
| *G06K 15/00* | (2006.01) |
| *G06K 15/02* | (2006.01) |
| *G06K 5/04* | (2006.01) |

(52) U.S. Cl.
CPC ............ *G03G 15/5054* (2013.01); *G06K 5/04* (2013.01); *G06K 15/027* (2013.01); *G03G 2215/0158* (2013.01)

(58) Field of Classification Search
CPC ........... G03G 15/5054; G03G 15/1605; G03G 15/5058; G03G 2215/00042; G03G 2215/00059; G03G 2215/00063; G03G 2215/0158; G03G 2215/0161; G06K 5/04; G06K 15/027; G06K 15/1219; G06K 15/1223; H04N 1/00045

USPC ............... 399/49, 66, 301; 347/116
See application file for complete search history.

(56) References Cited

U.S. PATENT DOCUMENTS

| | | | |
|---|---|---|---|
| RE32,967 E * | 6/1989 | St. John | B41F 13/025 226/10 |
| 5,072,244 A * | 12/1991 | Aoki | H04N 1/047 347/116 |
| 6,218,660 B1 * | 4/2001 | Hada | H04N 1/1008 250/226 |
| 9,316,942 B2 * | 4/2016 | Fukuhara | G01N 21/55 |

(Continued)

FOREIGN PATENT DOCUMENTS

| | | | | |
|---|---|---|---|---|
| JP | 57198628 A | * | 12/1982 | H01L 21/30 |
| JP | 2005-284116 | | 10/2005 | |
| JP | 2014044226 A | * | 3/2014 | |

*Primary Examiner* — Robert Beatty
(74) *Attorney, Agent, or Firm* — Amin, Turocy & Watson LLP (57) ABSTRACT

An image forming apparatus comprises a sensor which emits light with a spot diameter serving as a predetermined size to a pattern for position detection formed on a transfer medium conveyed by a conveyance section, and outputs a read signal corresponding to reflected light of the emitted light; a processing circuit which generates a differential signal obtained by differentiating the read signal output by the sensor, and outputs a signal obtained through an exclusive OR of the read signal and the differential signal obtained by differentiating the read signal; and a control section configured to specify a position at which a image forming section forms a image on the basis of the signal output by the processing circuit.

15 Claims, 9 Drawing Sheets

(56) References Cited

U.S. PATENT DOCUMENTS

2004/0165025 A1* 8/2004 Ishibashi ............ H04N 1/00002
　　　　　　　　　　　　　　　　　　　347/19
2007/0048031 A1* 3/2007 Kinoshita .......... G03G 15/0194
　　　　　　　　　　　　　　　　　　　399/301
2015/0139702 A1* 5/2015 Murakami ......... G03G 15/5041
　　　　　　　　　　　　　　　　　　　399/301

* cited by examiner

IMAGE FORMING APPARATUS AND PATTERN READING APPARATUS

FIELD

Embodiments described herein relate generally to an image forming apparatus and a pattern reading apparatus.

BACKGROUND

Conventionally, a printer acting as an image forming apparatus detects a position at which an image is formed in such a manner that a sensor for position detection reads a pattern for position detection formed on a medium. However, an error occurring in formation of the image by the printer also occurs in a case in which the pattern for position detection is formed with high resolution. Thus, the conventional printer has a problem that it is difficult to detect the position with high precision in a position detection with the high resolution.

DETAILED DESCRIPTION

In accordance with an embodiment, an image forming apparatus includes a conveyance section, an image forming section, a sensor, a processing circuit and a control section. The conveyance section conveys a transfer medium in a vertical scanning direction. The image forming section forms an image of a pattern for position detection obtained by arranging a plurality of patterns of which widths in the vertical scanning direction are a predetermined size at an interval of the predetermined size on the transfer medium conveyed by the conveyance section. The sensor emits light with a spot diameter serving as the predetermined size to the pattern for position detection formed on the transfer medium conveyed by the conveyance section, and outputs a read signal corresponding to reflected light of the emitted light. The processing circuit generates a differential signal obtained by differentiating the read signal output by the sensor, and outputs a signal obtained through an exclusive OR of the read signal and the differential signal obtained by differentiating the read signal. The control section specifies a position at which the image forming section forms the image on the basis of the signal output by the processing circuit.

Hereinafter, the embodiment is described with reference to the accompanying drawings.

Figure 1:
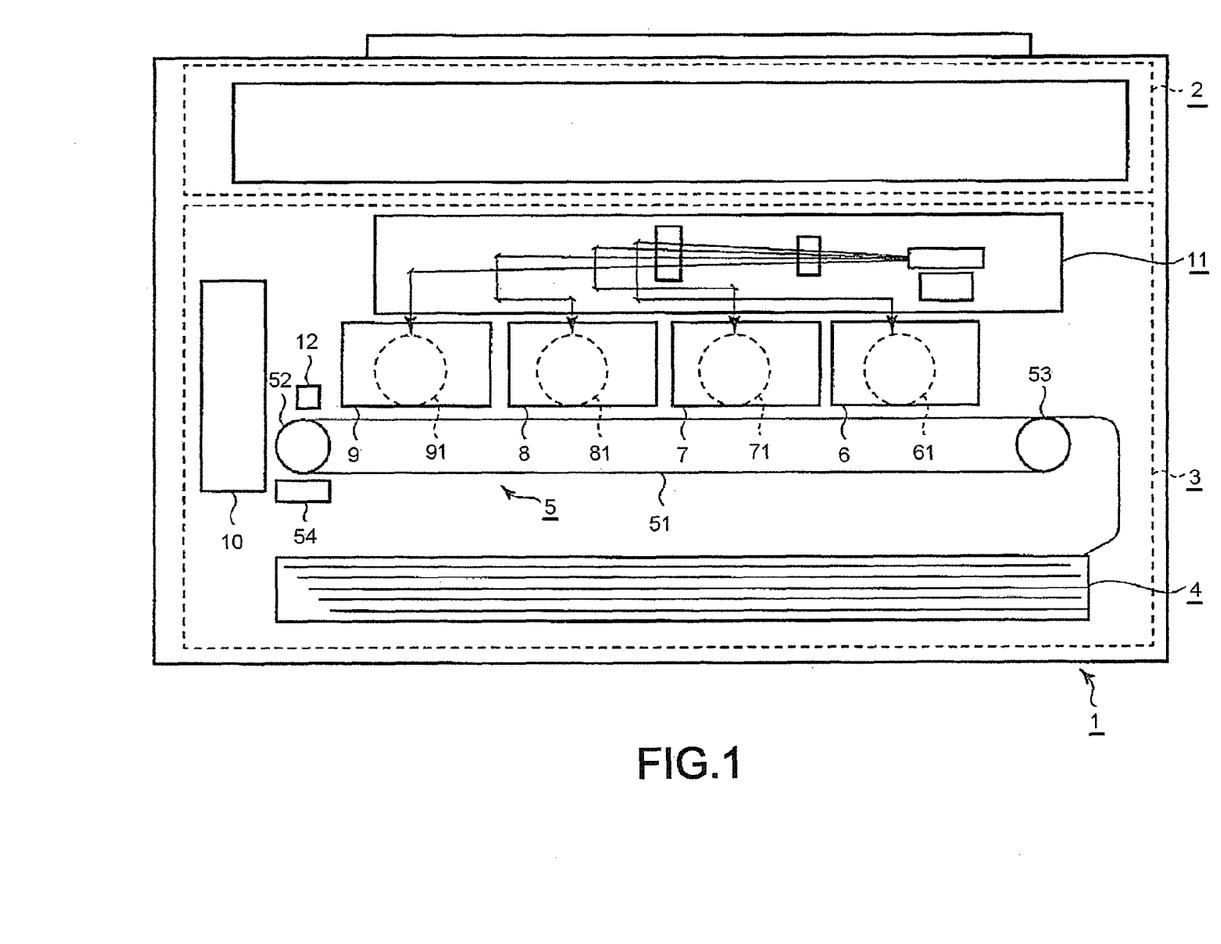
FIG. 1 is a cross-sectional view schematically illustrating an example of the inner configuration of an MFP including a printer acting as an image forming apparatus according to an embodiment.

FIG. 1 is a diagram schematically illustrating an example of the configuration of a digital MFP (Multi-Functional Peripheral) 1 acting as an image forming apparatus according to the embodiment.

The digital MFP 1 includes a scanner 2 and a printer 3. The scanner 2 reads an image of a document. For example, the scanner 2 reads a color image of the document. The scanner 2 outputs an electrical signal corresponding to three primary colors of light of red (R), green (G) and blue (B) from the document. The printer 3 forms an image on the basis of image data. For example, the digital MFP 1 carries out a copy processing in such a manner that the printer 3 prints the image read by the scanner 2 on a sheet.

The printer 3 includes a supply section 4, a conveyance section 5, a first image forming section 6, a second image forming section 7, a third image forming section 8, a fourth image forming section 9, a fixing section 10, an exposure section (optical system unit) 11 and a position reading section 12.

The supply section 4 takes out sheets one by one from a storage section in which a plurality of sheets is set. The supply section 4 supplies one sheet which is taken out from the storage section to the conveyance section 5.

The conveyance section 5 conveys the sheet serving as an image formed medium in the printer 3. For example, the conveyance section 5 conveys the sheet supplied from the supply section 4 towards a predetermined conveyance direction at a predetermined speed. In the example of the configuration shown in FIG. 1, the conveyance section 5 includes a conveyance belt 51, a drive drum 52, a driven drum 53 and a conveyance belt cleaner 55. The conveyance belt 51 conveys the sheet serving as the image formed medium towards the predetermined conveyance direction (sub-scan direction) at the predetermined speed. Further, a toner image can be directly formed on the conveyance belt 51 by each of the image forming sections 6, 7, 8 and 9. For example, in a case of carrying out an under-mentioned position detection processing of an image, each of the image forming sections 6, 7, 8 and 9 directly forms the toner image of a pattern for position detection on the conveyance belt 51. The conveyance belt 51 is wound on and stretched over the drive drum 52 and the driven drum 53. Further, the conveyance belt cleaner 55 cleans the surface of the conveyance belt 51. For example, the conveyance belt cleaner 55 removes toner on the conveyance belt 51.

The first image forming section 6, the second image forming section 7, the third image forming section 8 and the fourth image forming section 9 function as image forming sections for forming color images. The first image forming section 6, the second image forming section 7, the third image forming section 8 and the fourth image forming section 9 form the images with image forming materials different from each other. In the present embodiment, the first image forming section 6, the second image forming section 7, the third image forming section 8 and the fourth image forming section 9 form the images with toner (image forming materials) of which colors are different from each other through an electrophotographic system.

The first image forming section 6 forms a yellow image. The first image forming section 6 includes a photoconductive drum 61. The first image forming section 6 develops an electrostatic latent image formed on the photoconductive drum 61 with yellow toner. The first image forming section 6 transfers a yellow toner image, which is developed, onto the sheet conveyed by the conveyance section 5.

The second image forming section 7 forms a magenta image. The second image forming section 7 includes a photoconductive drum 71. The second image forming section 7 develops an electrostatic latent image formed on the photoconductive drum 71 with magenta toner. The second image forming section 7 transfers a magenta toner image, which is developed, onto the sheet conveyed by the conveyance section 5.

The third image forming section 8 forms a cyan image. The third image forming section 8 includes a photoconductive drum 81. The third image forming section 8 develops an electrostatic latent image formed on the photoconductive drum 81 with cyan toner. The third image forming section 8 transfers a cyan toner image, which is developed, onto the sheet conveyed by the conveyance section 5

The fourth image forming section 9 forms a black image. The fourth image forming section 9 includes a photoconductive drum 91. The fourth image forming section develops an electrostatic latent image formed on the photoconductive drum 91 with black toner. The fourth image forming section 9 transfers a black toner image, which is developed, onto the sheet conveyed by the conveyance section 5.

The exposure section (optical system unit) 11 exposes each of the photoconductive drums 61, 71, 81 and 91 with laser light to form the electrostatic latent image. The exposure section 11 includes a plurality of light sources for emitting the laser light and a polygon mirror for enabling the laser light to carry out scanning in a horizontal scanning direction. An example of the configuration of the exposure section 11 is described later. Hereinafter, a rotational axis direction of each of the photoconductive drums 61, 71, 81 and 91 is set as the horizontal scanning direction, and a rotation direction is set as the sub-scan direction.

The position reading section 12 reads the pattern for position detection (pattern serving as a detection object). The position reading section 12 is also a pattern reading apparatus for reading the pattern serving as the detection object. The position reading section 12 includes at least one sensor 21 and a processing circuit 22. For example, the sensor 21 is a reflection type sensor including a light source and a photoelectric conversion section. The light source of the sensor 21 is, for example, an LED. The photoelectric conversion section of the sensor 21 receives reflected light of light emitted from the light source to convert the reflected light to an electrical signal. The light emitted from the light source of the sensor 21 is formed into a spot diameter with a size corresponding to a width of the pattern for position detection at a predetermined reading position.

With the conveyance belt 51 moving in the sub-scan direction, the sensor 21 outputs a read signal obtained by scanning the conveyance belt 51 in the sub-scan direction. In other words, the sensor 21 of the position reading section 12 outputs the read signal obtained by reading the pattern for position detection drawn on the conveyance belt 51 with the toner. The sensor 21 is arranged at a position corresponding to a position at which the pattern for position detection is formed. The number of the sensors 21 may be one or more. In the present embodiment, after a case in which the number of the sensors 21 is one is described, a case in which the number of the sensors 21 is two, including a sensor 21b and a sensor 21c, is also described as a modification.

Furthermore, in the present embodiment, it is described that the printer 3 transfers the toner image on each of the photoconductive drums 61, 71, 81 and 91 onto the sheet. Thus, the present embodiment describes a case of executing the position detection processing on the pattern for position detection formed on the conveyance belt 51 by each image forming section on the basis of the signal read by the sensor. However, the image forming apparatus may transfer the image onto the sheet from an intermediate transfer body (transfer belt) after transferring the toner image developed on each photoconductive drum onto the intermediate transfer body. In the image forming apparatus including the transfer belt, the position detection processing described later may be executed on the pattern for position detection transferred on the transfer belt by each image forming section on the basis of the signal read by the sensor. Further, the position detection processing described later may be executed on the pattern formed (transferred) on the sheet by each image forming section on the basis of the signal read by the sensor.

Figure 2:
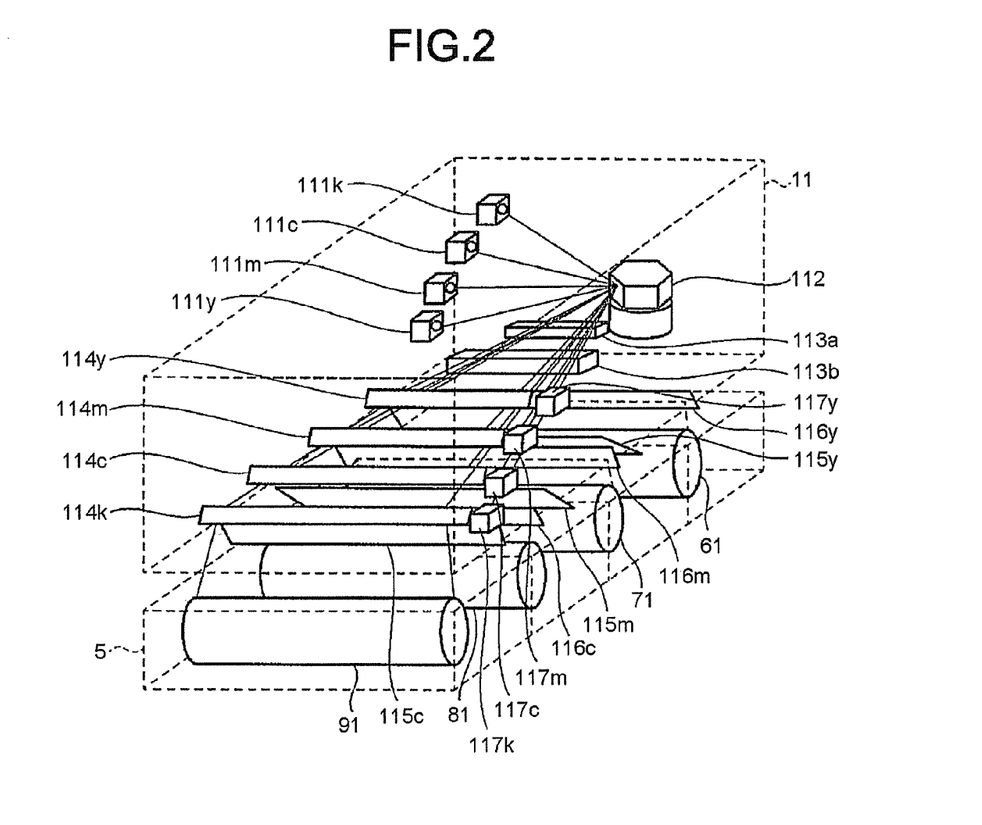
FIG. 2 is a diagram illustrating an example of the configuration of an exposure section of the printer according to the present embodiment.

FIG. 2 is a diagram illustrating the configuration of the exposure section 11 included in the MFP 1 according to the embodiment.

In the example of the configuration shown in FIG. 2, the exposure section 11 includes laser light-emitting units 111y, 111m, 111c and 111k, a polygon mirror unit 112, fθ lenses 113a and 113b, first reflecting mirrors 114y, 115y and 116y, second reflecting mirrors 114m, 115m and 116m, third reflecting mirrors 114c, 115c and 116c, a fourth reflecting mirror 114k, and horizontal synchronizing signal (HSYNC) sensors 117y, 117m, 117c and 117k.

The laser light-emitting units 111y, 111m, 111c and 111k emit lasers according to an image signal. The polygon mirror unit 112 rotates a polygon mirror. The rotated polygon mirror reflects the lasers emitted by the laser light-emitting units 111y, 111m, 111c and 111k to scan the reflected lasers on the fθ lenses 113a and 113b in a main-scan direction. The fθ lenses 113a and 113b correct a pixel pitch interval difference or a scanning position, a shape and the like to guide the lasers to all the reflecting mirrors.

The first reflecting mirrors 114y, 115y and 116y reflect the lasers from the fθ lenses 113a and 113b to the photoconductive drum 61 of the first image forming section 6. The second reflecting mirrors 114m, 115m and 116m reflect the lasers from the fθ lenses 113a and 113b to the photoconductive drum 71 of the second image forming section 7. The third reflecting mirrors 114c, 115c and 116c reflect the lasers from the fθ lenses 113a and 113b to the photoconductive drum 81 of the third image forming section 8. The fourth reflecting mirror 114k reflects the lasers from the fθ lenses 113a and 113b to the photoconductive drum 91 of the fourth image forming section 9.

The HSYNC sensors 117y, 117m, 117c and 117k detect that the lasers respectively enter the photoconductive drums of the first to fourth image forming sections 6~9 before predetermined time at which the lasers are scanned in the predetermined direction. The HSYNC sensors 117y, 117m, 117c and 117k detect the incidence of the lasers to output HSYNC signals each of which can be used as a reference of writing start of one line.

Figure 3:
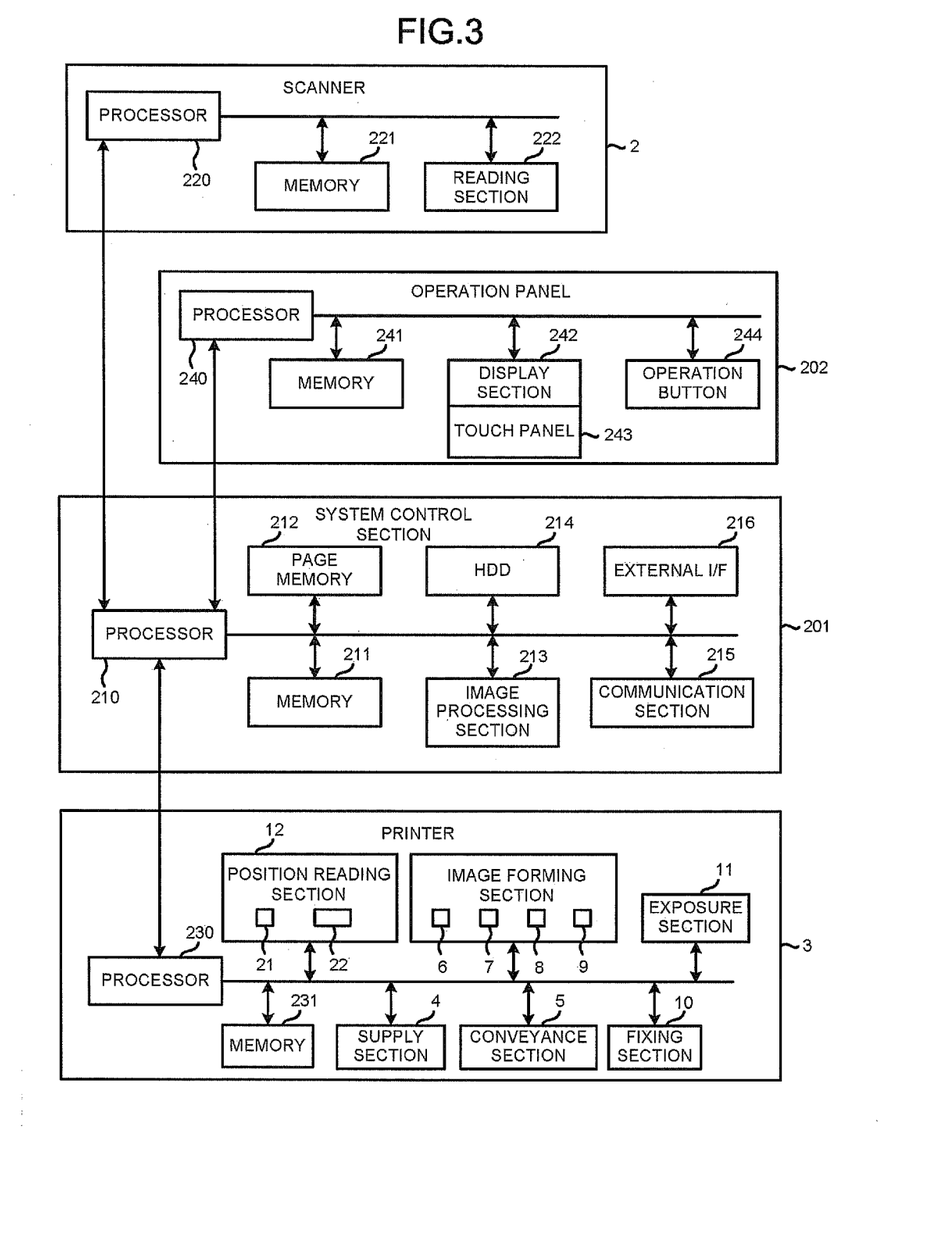
FIG. 3 is a block diagram illustrating an example of the configuration of a control system of the MFP according to the present embodiment.

FIG. 3 is a block diagram illustrating an example of the configuration of a control system of the MFP 1 according to the present embodiment.

In the example of the configuration shown in FIG. 3, the control system of the MFP 1 is generally classified into a system control section 201, an operation panel 202, the scanner 2 and the printer 3.

The system control section 201 includes a processor 210, a memory 211, a page memory 212, an image processing section 213, a data storage section (HDD) 214 and a communication section 215.

The processor 210 is connected with a processor 230 of the printer 3, a processor 220 of the scanner 2 and a processor 240 of the operation panel 202 via an interface. The processor 210 realizes various processing functions by executing programs stored in the memory 211 or the data storage section 214.

In other words, the processor 210 outputs an operation instruction to each section or acquires various kinds of information from each section by executing the programs stored in the memory 211. For example, the processor 210 specifies the position at which each of the image forming sections 6 to 9 forms the image on the basis of the signal obtained in such a manner that the position reading section 12 of the printer 3 reads the pattern for position detection. Further, the processor 210 controls an image forming processing by each of the image forming sections 6 to 9 including correction of an image forming position according to a specific image forming position through a read result of the pattern.

The memory 211 includes a RAM (Random Access Memory), a ROM (Read Only Memory) and a data memory. The RAM functions as a working memory or a buffer memory. The ROM is a non-rewritable non-volatile memory. The ROM functions as a program memory. The data memory is a rewritable non-volatile memory. The page memory 212 stores the image data. For example, the page memory 212 copies or decompresses the image data serving as a processing object.

The image processing section 213 carries out an image processing such as correction, compression or expansion on the image data. For example, the image processing section 213 converts the image data read by the scanner 2 to an image signal used for the printer 3 to carry out the image forming processing. Further, the image processing section 213 also includes a function of carrying out correction of an amount of deviation according to the position, detected through the position detection processing of the image described later, at which each of the image forming sections 6 to 9 forms the image.

The data storage section 214 stores control data, a control program, setting information and the image data. The data storage section 214 is constituted by a rewritable non-volatile memory such as an HDD (Hard Disk Drive). The data storage section 214, for example, stores the image data compressed by the image processing section 213.

The communication section 215 is an interface for carrying out data communication with an external device. An external I/F 216 is an interface for connecting an external memory device.

Next, an example of the configuration of the operation panel 202 is described.

In the example of the configuration shown in FIG. 3, the operation panel 202 includes the processor 240, a memory 241, a display section 242, a touch panel 243 and an operation button 244. The processor 240 is connected with the memory 241, the display section 242, the touch panel 243 and the operation button 244.

The processor 240 realizes various processing by executing programs stored in the memory 241. For example, the processor 240 carries out operation control of each section of the operation panel 202 and monitoring of an operating state of each section by executing the programs. Further, the processor 240 is connected with the processor 210 of the system control section 201 via the interface. For example, the processor 240 notifies the system control section 201 of information input by a user.

The memory 241 includes a RAM (Random Access Memory), a ROM (Read Only Memory) and a data memory. The RAM functions as a working memory or a buffer memory. The ROM is a non-rewritable non-volatile memory. The ROM functions as a program memory. The data memory is a rewritable non-volatile memory.

Display contents of the display section 242 are controlled according to an operation instruction from the processor 240. The touch panel 243 arranged on the display screen of the display section 242 detects a position touched on the display screen. For example, the processor 240 displays an icon which is selectable on the touch panel 243 together with operation guidance on the display section 242. The processor 240 determines the information input by the user according to the touched position which is detected by the touch panel 243. The operation button 244 is composed of hard keys such as a start key, a reset key and the like.

Next, an example of the configuration of the scanner 2 is described.

In the example of the configuration shown in FIG. 3, the scanner 2 includes the processor 220, a memory 221 and a reading section 222. The processor 220 is connected with the memory 221 and the reading section 222.

The processor 220 realizes various processing by executing programs stored in the memory 221. For example, the processor 220 carries out operation control of each section in the scanner 2 and monitoring of an operating state of each section by executing the programs. Further, the processor 220 is connected with the processor 210 of the system control section 201 via the interface. The processor 220 executes a scan processing according to an operation instruction from the system control section 201.

The memory 221 includes a RAM (Random Access Memory), a ROM (Read Only Memory) and a data memory. The RAM functions as a working memory or a buffer memory. The ROM is a non-rewritable non-volatile memory. The ROM functions as a program memory. The data memory is a rewritable non-volatile memory.

The reading section 222 reads an image of a document surface according to an operation instruction from the processor 220. For example, the reading section 222 moves the reading position at a predetermined speed to read the image of the whole document through emitting the visible light. Further, the reading section 222 may read the image of the document conveyed by an ADF.

Next, an example of the configuration of the printer 3 is described.

In the example of the configuration shown in FIG. 3, the printer 3 includes the processor 230, a memory 231, the supply section 4, the conveyance section 5, the image forming sections 6 to 9, the fixing section 10, the exposure section 11 and the position reading section 12. Further, the processor 230 is connected with the memory 231, the supply section 4, the conveyance section 5, the image forming sections 6 to 9, the fixing section 10, the exposure section 11 and the position reading section 12.

The processor 230 realizes various processing by executing programs stored in the memory 231. For example, the processor 230 carries out operation control of each section in the printer 3 and monitoring of an operating state of each section by executing the programs. Further, the processor 230 is connected with the processor 210 of the system control section 201 via the interface. The processor 230 executes a printing processing according to an operation instruction from the system control section 201.

The memory 231 includes a RAM (Random Access Memory), a ROM (Read Only Memory) and a data memory. The RAM functions as a working memory or a buffer memory. The ROM is a non-rewritable non-volatile memory. The ROM functions as a program memory. The data memory is a rewritable non-volatile memory.

The supply section 4 and the conveyance section 5 drive rollers arranged in all the parts in the printer 3 according to an operation instruction from the processor 230. The exposure section 11 forms the electrostatic latent image on each of the photoconductive drums 61, 71, 81 and 91 of the image forming sections 6 to 9 according to an operation instruction from the processor 230. Each of the image forming sections 6 to 9 develops the electrostatic latent image formed on each of the photoconductive drums 61, 71, 81 and 91 with the toner of each color according to an operation instruction from the processor 230.

The fixing section 10 fixes the toner image on the sheet according to an operation instruction from the processor 230. For example, the fixing section 10 drives a heat roller and a pressure roller in a state of setting a surface temperature of the heat roller to a fixing temperature through the control of the processor 230. In this way, the fixing section 10 fixes the toner image which is transferred onto the sheet on the sheet.

The position reading section 12 reads the pattern for position detection formed on the transfer medium such as the conveyance belt 51 (or the transfer belt) in the position detection processing. The position reading section 12 includes the sensor 21 and the processing circuit 22. The sensor 21 detects the toner on the belt. In other words, the sensor 21 detects the toner on the conveyance belt 51 (transfer medium) in the spot diameter with the size corresponding to the pattern for position detection. The sensor 21 outputs the signal (read signal) indicating a detection result. The processing circuit 22 processes the signal from the sensor 21. The function of the processing circuit 22 may be realized through hardware or in such a manner that the processor executes the program. Further, in the position reading section 12, the number of the sensors 21 may be one or more (for example, two).

Next, the position detection processing carried out by the printer 3 of the MFP 1 according to the present embodiment is described.

The printer 3 according to the present embodiment includes four image forming sections 6 to 9. The printer 3 forms the color image by superimposing the images formed by the image forming sections 6 to 9 and transferring the superimposed images onto the sheet. The printer 3 carries out the position detection processing for detecting the position at which each of the image forming sections 6 to 9 forms the image in order to overlap each image formed by each of the image forming sections 6 to 9 with high accuracy. The printer 3 according to the present embodiment carries out the position detection processing for detecting the position at which the image is formed on the basis of the signal obtained in such a manner that the sensor 21 of the position reading section 12 reads the pattern for position detection formed on the conveyance belt 51 as the transfer medium.

Furthermore, in the present embodiment, it is described that the position detection processing is executed in such a manner that the position reading section 12 reads the pattern for position detection formed on the conveyance belt 51. However, the position detection processing described later is also applicable in a case in which the conveyance belt 51 is replaced with the transfer belt. The position detection processing can also be realized in such a manner that the position reading section reads the pattern for position detection formed on the sheet. Furthermore, the position detection processing can also be realized in such a manner that the position reading section reads the pattern for position detection formed on the photoconductive drum.

Figure 4:
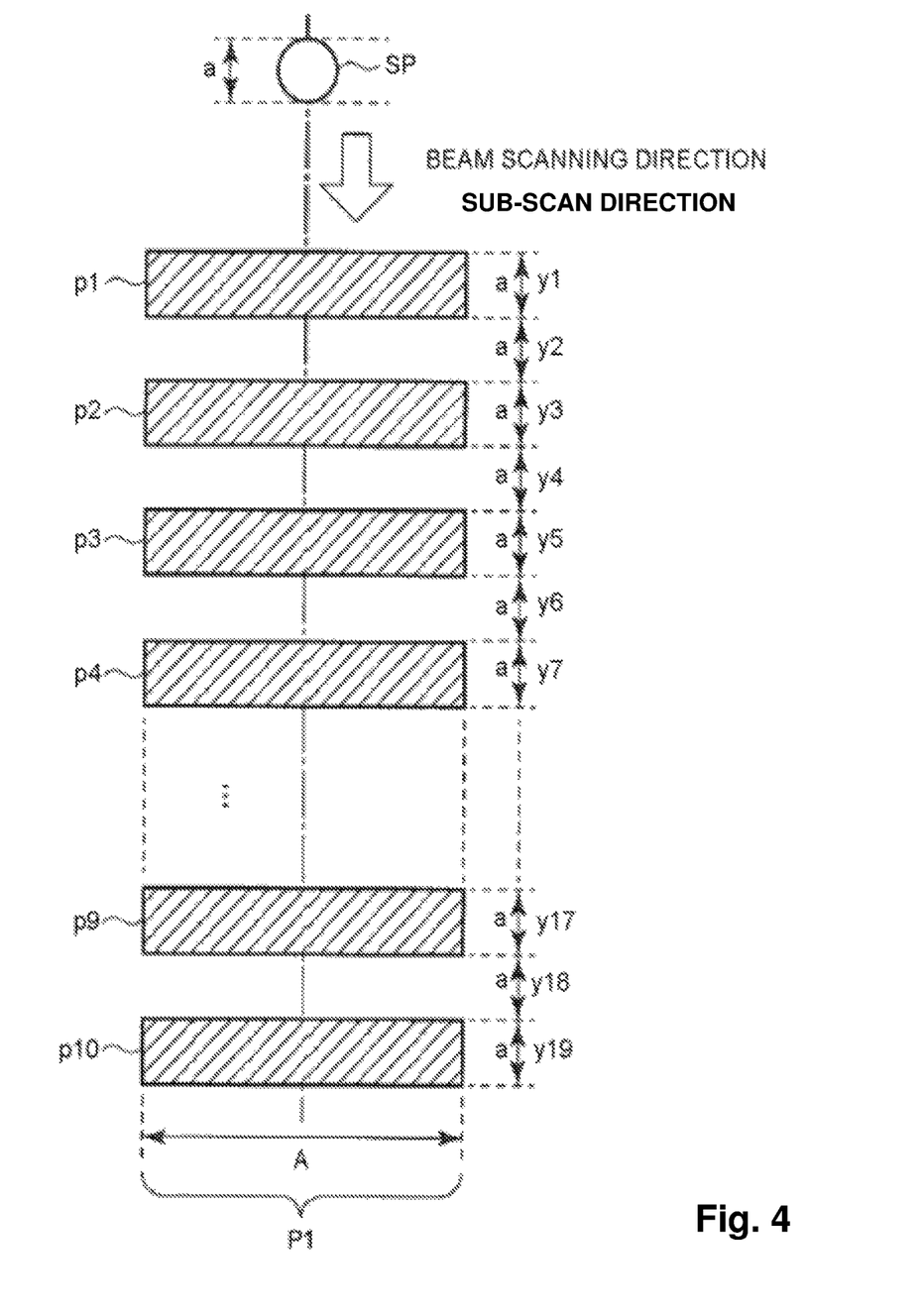
FIG. 4 is a diagram illustrating a first example of a pattern for position detection read by a sensor of a position reading section of the printer according to the present embodiment.

FIG. 4 is a diagram illustrating a first example (first pattern P1) of the pattern for position detection.

In the example shown in FIG. 4, the pattern for position detection P1 is drawn at resolution in the sub-scan direction which is reference resolution at the reading position of the sensor 21. In the printer 3, the conveyance direction of the conveyance belt 51 is the sub-scan direction. The pattern for position detection P1 is formed on the conveyance belt 51 as the transfer medium. For example, in a case in which the reference resolution is 600 dpi, a width of one image pixel which can be formed on the transfer medium is 42.33 μm. In a case in which the resolution is 600 dpi, a diameter of a spot (spot of the light from the light source) SP serving as a read range of the sensor 21 is also 42.33 μm.

The pattern for position detection P1 arranges a plurality of patterns p1, p2, p3, . . . of which the widths in the sub-scan direction are all width a corresponding to one image pixel at the reading position of the sensor 21 at an interval of the width a. The light emitted from the light source of the sensor 21 is constituted in such a manner that the size of the diameter of the spot SP is equal to the width a at the reading position on the transfer medium. The sensor 21 outputs a signal obtained by carrying out photoelectric conversion on the reflected light of the light emitted from the light source. Thus, the spot SP of the light emitted from the light source of the sensor 21 is a detection range of the sensor 21.

In other words, the width a in the vertical scanning direction of each of the patterns p1, p2, p3, . . . constituting the pattern P1 has the same size as the spot diameter a serving as the detection range of the sensor 21. Further, the patterns p1, p2, p3, . . . constituting the pattern P1 are arranged at the interval a with the size identical to the spot diameter a serving as the detection range of the sensor 21 in the vertical scanning direction. Further, in the example shown in FIG. 4, the size of the width A in the horizontal scanning direction (longitudinal direction) of each of the patterns p1, p2, p3, . . . constituting the pattern P1 is equal to or greater than that of the width a of one image pixel. Through such a configuration, the spot of the light emitted from the light source of the sensor 21 is confined to the width a of one image pixel of the pattern for position detection P1 at the reading position on the transfer medium.

Next, the configuration of the position reading section 12 is described in detail.

The position reading section 12 includes the sensor 21 and the processing circuit 22 for processing the signal (read signal) obtained by reading the pattern for position detection P1 by the sensor 21. The processing circuit 22 converts the read signal of the sensor 21 to a signal corresponding to a read signal of a pattern with resolution higher than the resolution of the pattern for position detection P1.

Figure 5:
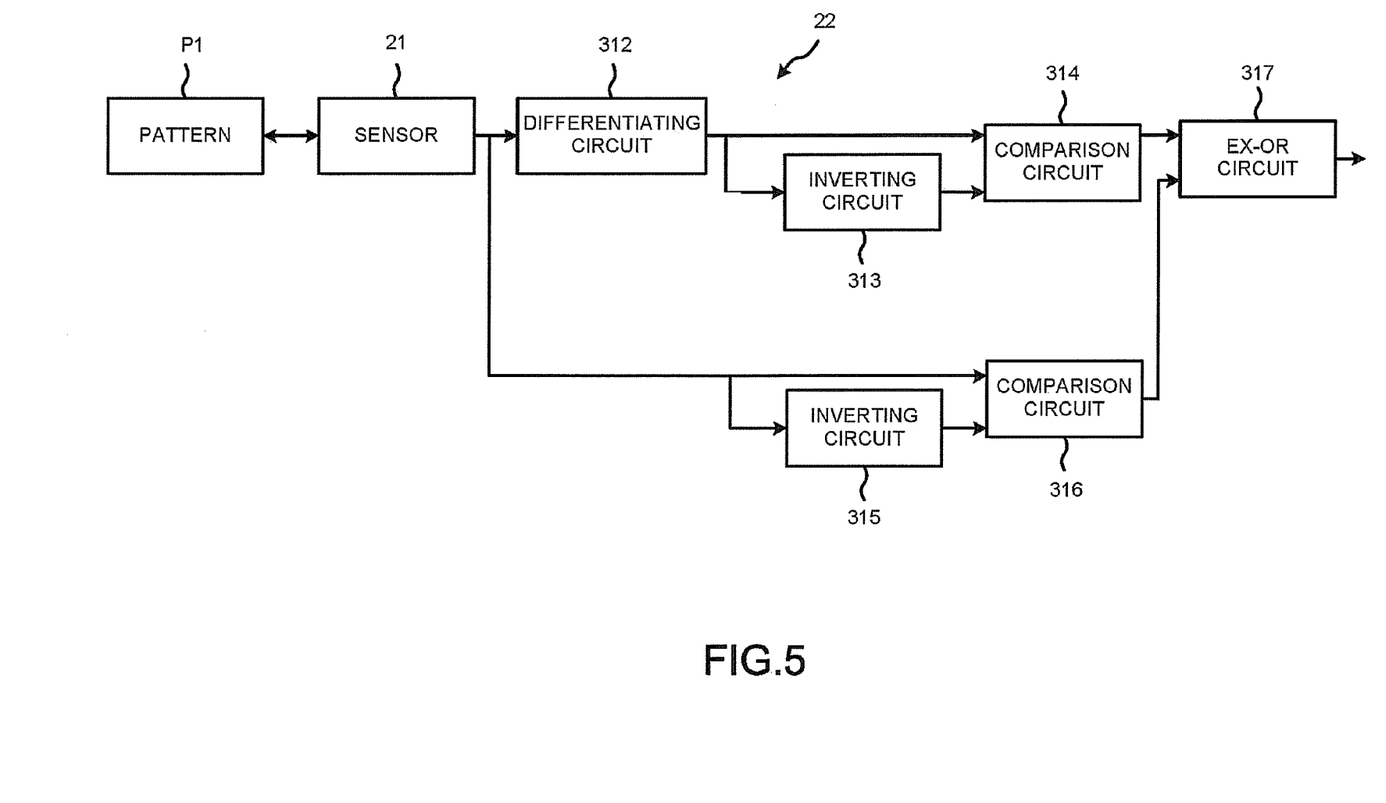
FIG. 5 is a block diagram illustrating a first example of the configuration of the position reading section of the printer according to the present embodiment.

FIG. 5 is a block diagram illustrating an example of the configuration of the processing circuit 22 included in the position reading section 12 of the printer 3.

In the example of the configuration shown in FIG. 5, the processing circuit 22 includes a differentiating circuit 312, an inverting circuit (second inverting circuit) 313, a comparison circuit (second comparison circuit) 314, an inverting circuit (first inverting circuit) 315, a comparison circuit (second comparison circuit) 316 and an EX-OR circuit 317.

The differentiating circuit 312 is connected with the sensor 21. The differentiating circuit 312 differentiates the signal (read signal) input from the sensor 21, and outputs the differentiated signal (differential signal). The inverting circuit 313 is connected with output of the differentiating circuit 312. Thus, the inverting circuit 313 outputs a signal (inversion signal) obtained by inverting the signal obtained by differentiating the signal from the sensor 21. The comparison circuit 314 outputs a signal (second binary signal) obtained by binarizing the signal (differential signal) from the differentiating circuit and the inversion signal of the differential signal from the inverting circuit 313 as input signals.

Further, the signal from the sensor 21 is also supplied to the inverting circuit 315 and the comparison circuit 316. In other words, the inverting circuit 315 is connected with the output of the sensor 21. The inverting circuit 315 outputs a signal (inversion signal) obtained by inverting the signal (read signal) from the sensor 21. The comparison circuit 316 outputs a signal (first binary signal) obtained by binarizing the signal from the sensor 21 and the inversion signal from the inverting circuit 313 as the input signals.

The EX-OR circuit 317 is connected with the comparison circuit 314 and the comparison circuit 316. The EX-OR circuit 317 outputs a signal indicating an exclusive OR of the output signal (second binary signal) from the comparison circuit 314 and the output signal (first binary signal) from the comparison circuit 316. In other words, the EX-OR circuit 317 outputs an ON signal when only one of the first binary signal and the second binary signal serving as the input signals is turned on.

Figure 6:
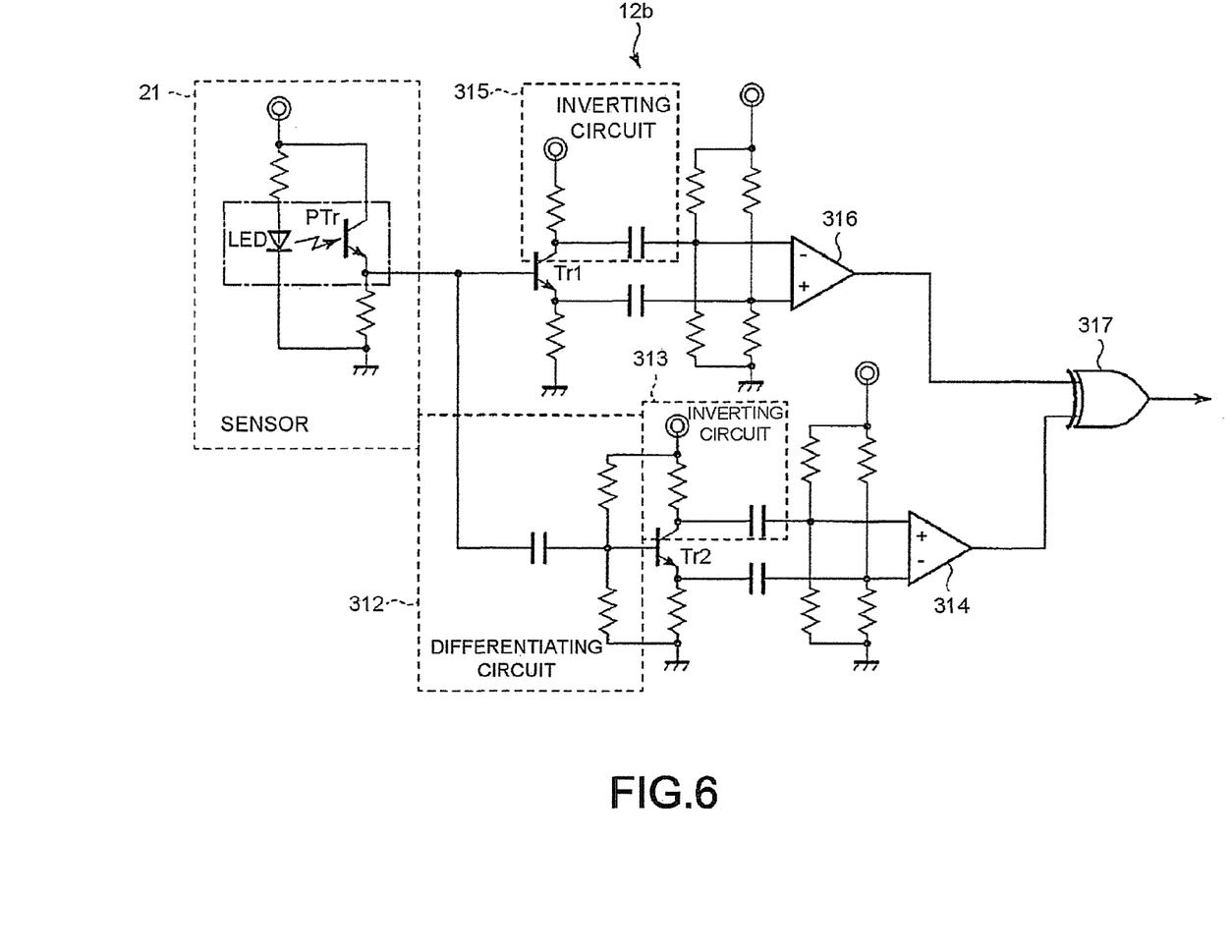
FIG. 6 is a diagram illustrating an example of a circuit for realizing the first example of the configuration of the position reading section of the printer according to the present embodiment.

FIG. 6 is a diagram illustrating an example of the configuration of a circuit for realizing the processing circuit 22 shown in FIG. 5.

In the example of the configuration shown in FIG. 6, the sensor 21 is composed of a sensor circuit including the LED as the light source and a phototransistor PTr as a photoelectric conversion element.

The output signal (read signal) of the sensor 21 is input to the inverting circuit 315 and the comparison circuit (first comparator) 316 via a transistor Tr1. The inverting circuit 315 outputs the signal obtained by inverting the output signal of the sensor 21 to the first comparator 316. The first comparator 316 compares the output signal of the sensor 21 with the output signal from the inverting circuit 315 obtained by inverting the output signal of the sensor 21. The first comparator 316 outputs the binary signal (first binary signal) as a comparison result between the output signal of the sensor 21 and the output signal of the inverting circuit 315.

The output signal (read signal) of the sensor 21 is also input to the differentiating circuit 312. The differentiating circuit 312 includes a condenser. The output of the differentiating circuit 312 is input to the inverting circuit 313 and the comparison circuit (second comparator) 314 via a transistor Tr2. The inverting circuit 313 outputs the signal obtained by inverting the output signal of the differentiating circuit 312 to the second comparator 314. The second comparator 314 compares the output signal of the differentiating circuit 312 with the output signal from the inverting circuit 313 obtained by inverting the output of the differentiating circuit 312. The second comparator 314 outputs the binary signal (second binary signal) as a comparison result between the output signal of the differentiating circuit 312 and the output signal of the inverting circuit 313.

In the circuit shown in FIG. 6, a circuit constant is set to a value corresponding to the pattern for position detection and a conveyance speed of the transfer medium such as the conveyance belt 51. For example, a differential constant in the circuit shown in FIG. 6 is set so that the differentiated differential signal becomes a cosine waveform (for example, refer to a signal S02 shown in FIG. 7) in a case in which the input signal from the sensor 21 becomes a sinusoidal waveform (for example, refer to a signal S0 shown in FIG. 7).

Furthermore, FIG. 6 is an example of constituting the processing circuit 22 shown in FIG. 5 with hardware by combining various circuit elements. However, the processing circuit 22 may be realized with software. In other words, a part or all of components of the processing circuit 22 shown in FIG. 5 may be realized in such a manner that the processor executes the programs. In other words, it is possible to realize functions equivalent to all the circuits constituting the processing circuit 22 in such a manner that the processor executes the programs.

Next, each signal in the position reading section 12 is described.

FIG. 7 (FIG. 7A~7E) is a diagram illustrating states of the read signal of the sensor 21 on the pattern for position detection and each signal in the processing circuit 22.

Figure 7A:
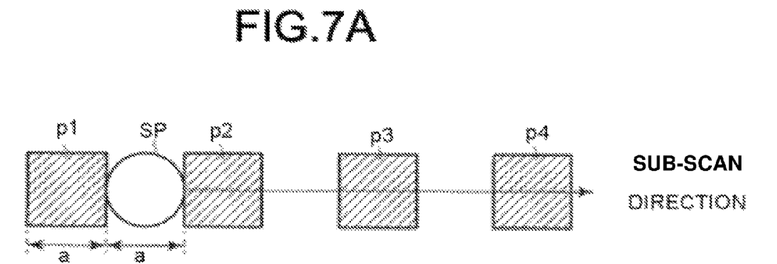
FIGS. 7A-7E are timing charts illustrating each signal in the position reading section of the printer according to the present embodiment.

FIG. 7A illustrates relation between the detection range (read spot) SP of the sensor 21 in the vertical scanning direction and the pattern for position detection P1. As shown in FIG. 7A, in the vertical scanning direction, the spot diameter of the read spot SP has the same size a as the width of each of the patterns p1, p2, . . . , and the interval between the patterns p1, p2, . . . .

Figure 7B:
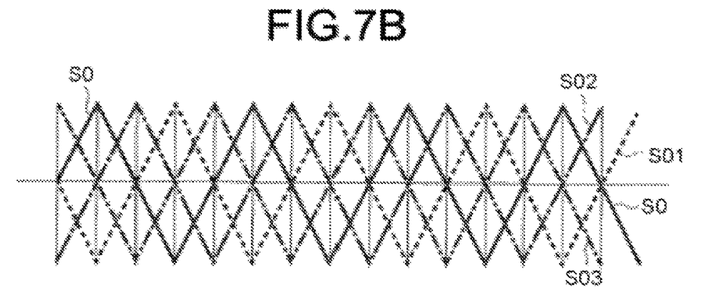

FIG. 7B illustrates the states of the read signal S0 of the sensor 21 and each of signals S01, S02 and S03 generated from the read signal. The signal S01 is the inversion signal obtained by inverting the read signal S0 of the sensor 21. The signal S02 is the differential signal obtained by differentiating the read signal S0. The signal S03 is the inversion signal obtained by inverting the differential signal S02. In a case in which the read signal S0 is set as the sinusoidal waveform, the differential signal S02 is the cosine waveform obtained by delaying the phase of the sinusoidal waveform by 90 degrees. Further, the inversion signal S01 is an anti-sinusoidal waveform obtained by inverting the sinusoidal waveform. Further, the inversion signal of the differential signal S03 is an anti-cosine waveform obtained by inverting the cosine waveform.

Figure 7C:
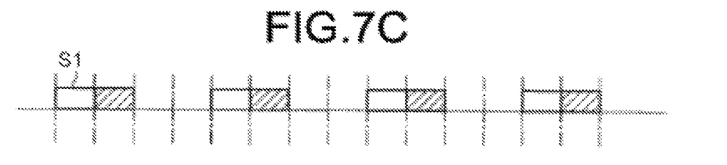

FIG. 7C illustrates a first binary signal S1 obtained from the read signal S0 and the inversion signal S01.

The first binary signal S1 is the output signal of the comparison circuit 316. The comparison circuit 316 sets the read signal S0 with the sinusoidal waveform and the inversion signal S01 with the anti-sinusoidal waveform as the input signals. As a result of comparing the signal S0 with the signal S01, the comparison circuit 316 sets the first binary signal S1 shown in FIG. 7C as the output signal.

Figure 7D:
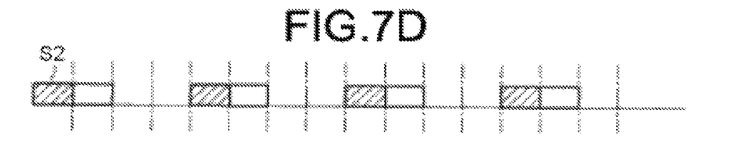

FIG. 7D illustrates a second binary signal S2 obtained from the differential signal S02 and the inversion signal S03.

The second binary signal S2 is the output signal of the comparison circuit 314. The comparison circuit 314 sets the differential signal S02 with the cosine waveform and the inversion signal S03 with the anti-cosine waveform as the input signals. As a result of comparing the signal S02 with the signal S03, the comparison circuit 314 sets the second binary signal S2 shown in FIG. 7D as the output signal.

Figure 7E:
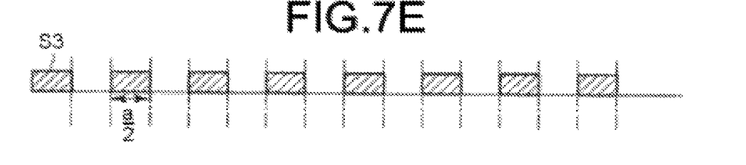

FIG. 7E illustrates a signal S3 obtained from the first binary signal S1 and the second binary signal S2.

The signal S3 is the output signal of the EX-OR circuit 317. The EX-OR circuit 317 outputs the signal indicating the exclusive OR of the first binary signal S1 and the second binary signal S2. As shown in FIG. 7C and FIG. 7D, if on-off of one time is set as one cycle, the first binary signal S1 and the second binary signal S2 are signals shifted by ¼ cycle. This is because a phase contrast between the sinusoidal waveform for generating the first binary signal S1 and the cosine waveform for generating the second binary signal S2 is 90 degrees.

The EX-OR circuit 317 outputs an ON signal while either of the first binary signal S1 and the second binary signal S2 is turned on. As the first binary signal S1 and the second binary signal S2 are shifted by ¼ cycle, the EX-OR circuit 317 outputs the ON signal during half of the period during which the first binary signal S1 is turned on and half of the period during which the second binary signal S2 is turned on. In other words, the EX-OR circuit 317 outputs the signal obtained by repeating on-off with the half cycle of the first binary signal S1 (or the second binary signal S2).

The output signal of the EX-OR circuit 317 shown in FIG. 7E becomes a signal identical to the signal obtained by reading the pattern for position detection at resolution twice as much as the reference resolution. Further, the output signal S3 of the EX-OR circuit 317 becomes a signal identical to the signal obtained when an error becomes ½ even with respect to an error caused by printing precision of the pattern for position detection. For example, in a case of carrying out the image formation on a pattern with a width of 1 mm at the precision of which the error is 0.1 mm, the width of the pattern is considered to be 1 mm±0.1 mm. The position reading section 12 reads the pattern for position detection which is the pattern with the width of 1 mm±0.1 mm. In this case, the EX-OR circuit 317 outputs the signal equivalent to the signal obtained by reading the pattern with the width of (1±0.1×½) mm=0.5 mm±0.05 mm.

According to the position reading section including the processing circuit as stated above, the signal equivalent to the signal obtained by reading the pattern formed at the resolution twice as much as the reference resolution. For example, if reading the pattern formed at the resolution of 600 dpi, the position reading section can output the signal equivalent to the read signal of the pattern formed at the resolution of 1200 dpi. In this way, in the image forming apparatus of the present embodiment, a position detection result corresponding to the read result of the pattern formed at the resolution higher than (resolution twice as much as) the resolution of the pattern for position detection formed on the transfer medium.

Next, the modification of the embodiment described above is described.

A position reading section 12' which is described hereinafter as the modification can be applied as the position reading section of the digital MFP with configuration shown in FIG. 1 and FIG. 3. Furthermore, the sections other than the position reading section can be realized with the configuration identical to the foregoing configuration of the digital MFP shown in FIG. 1 and FIG. 3, and the detailed descriptions thereof are omitted.

Figure 8:
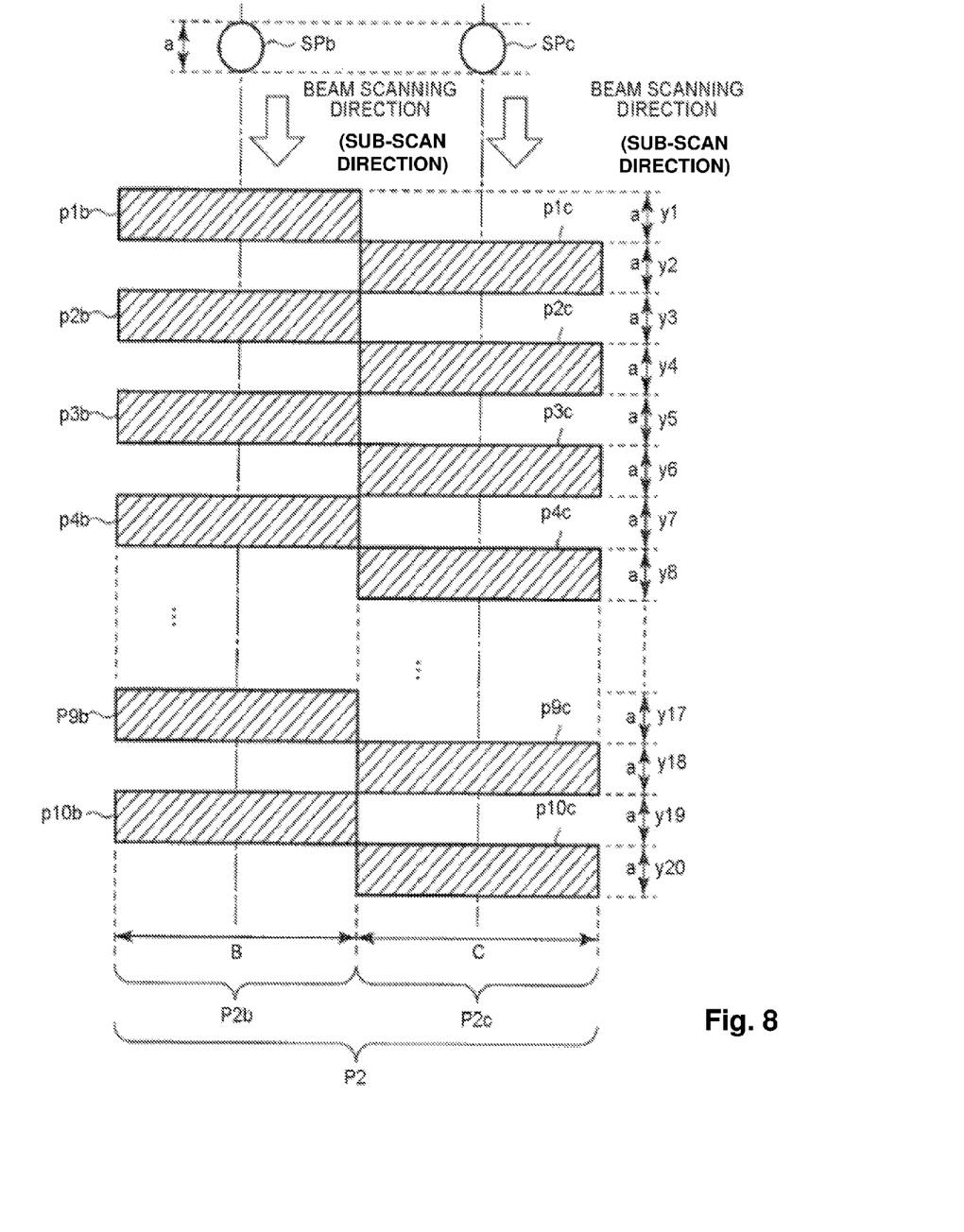
FIG. 8 is a diagram illustrating a second example of the pattern for position detection read by the sensor of the position reading section of the printer according to the present embodiment.
Figure 9:
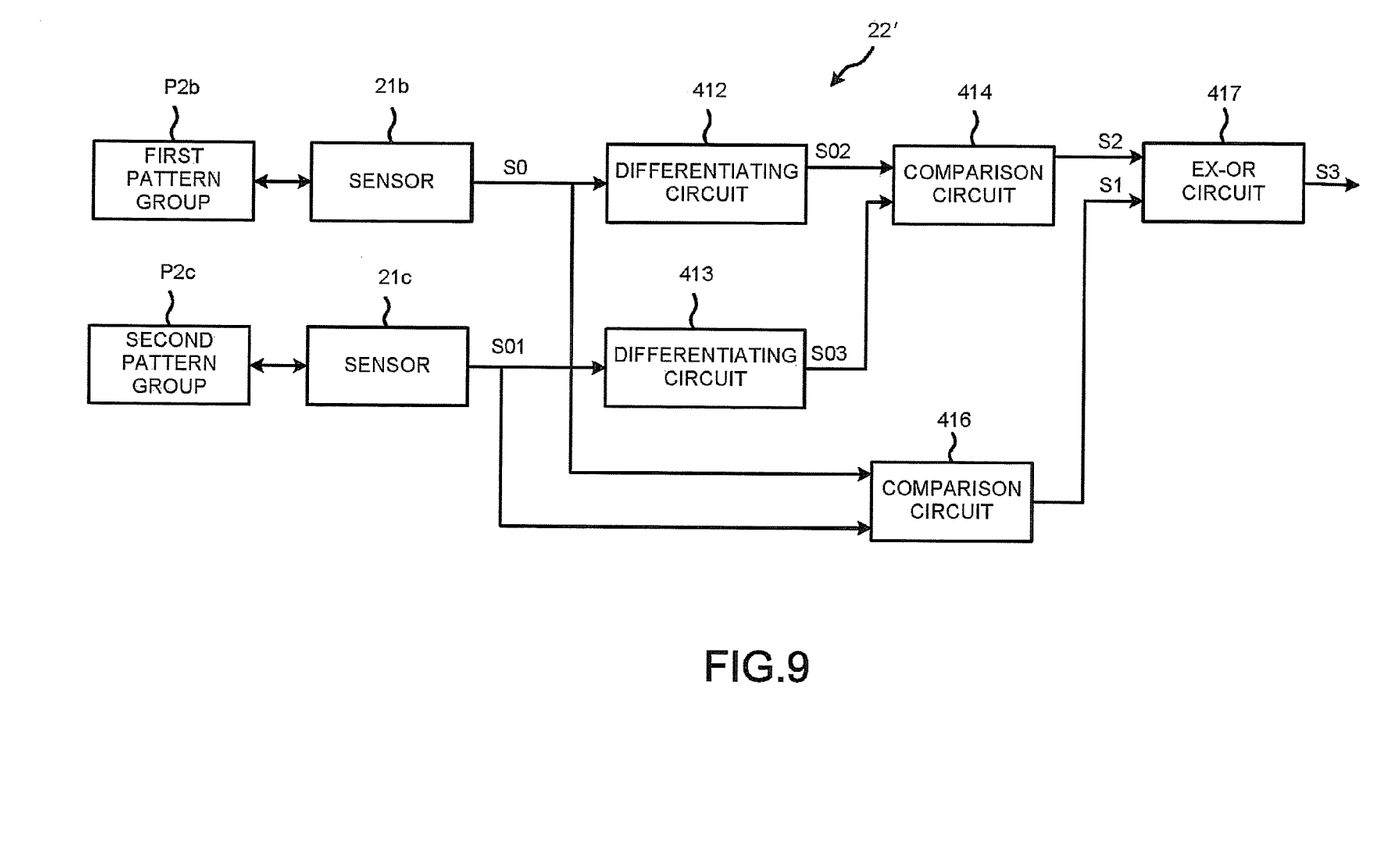
FIG. 9 is a block diagram illustrating a second example of the configuration of the position reading section of the printer according to the present embodiment.

FIG. 8 is a diagram illustrating a second example (second pattern P2) of the pattern for position detection. FIG. 9 is a diagram illustrating an example of the configuration of the position reading section 12' for reading the pattern P2 shown in FIG. 8.

The position reading section 12' is arranged in the digital MFP shown in FIG. 1 and FIG. 3, for example, instead of the position reading section 12. As shown in FIG. 8 and FIG. 9, the position reading section 12' includes two sensors 21b and 21c and a processing circuit 22'. Reading positions of the sensor 21b and the sensor 21c are respectively set on the conveyance belt 51 as the transfer medium. However, the reading position of the sensor 21b and the reading position of the sensor 21c are different positions on the same straight line in the horizontal scanning direction (direction vertical to the vertical scanning direction).

The pattern for position detection P2 shown in FIG. 8 is drawn at resolution in the vertical scanning direction which is reference resolution at the reading position of the sensor 21b and the reading position of the sensor 21c. The printer 3 sets the conveyance direction of the conveyance belt 51 as the vertical scanning direction and forms the pattern for position detection P2 on the conveyance belt 51. A detection range (read spot) of the sensor 21b at the reading position on conveyance the belt 51 has a size corresponding to the reference resolution. Further, a detection range (read spot) of the sensor 21c at the reading position on the conveyance belt 51 also has a size corresponding to the reference resolution. For example, in a case in which the reference resolution is 600 dpi, a width of one image pixel which can be formed on the transfer medium is 42.33 µm. In a case in which the resolution is 600 dpi, diameters of read spots (spots of the light from the light sources) SPb and SPc of the sensors 21b and 21c are also 42.33 µm.

The pattern for position detection P2 includes a first pattern group P2b and a second pattern group P2c. The first pattern group P2b includes a plurality of patterns p1b, p2b, p3b, . . . . The first pattern group P2b arranges a plurality of the patterns p1b, p2b, p3b, . . . of which the widths in the vertical scanning direction are all width a corresponding to one image pixel at the reading position of the sensor 21b in parallel at an interval of the width a. The second pattern group P2c includes a plurality of patterns p1c, p2c, p3c, . . . . The second pattern group P2c arranges a plurality of the patterns p1c, p2c, p3c, . . . of which the widths in the vertical scanning direction are all width a corresponding to one image pixel at the reading position of the sensor 21c in parallel at an interval of the width a.

Each pattern of the first pattern group P2b and each pattern of the second pattern group P2c are arranged in parallel in the horizontal scanning direction in an inverted state as shown in FIG. 8. In other words, each pattern of the second pattern group P2c is not arranged in the horizontal scanning direction in which each pattern of the first pattern group P2b is arranged. On the contrary, each pattern of the first pattern group P2b is not arranged in the horizontal scanning direction in which each pattern of the second pattern group P2c is arranged. Thus, the sensor 21b and the sensor 21c read the pattern groups in a state in which the pattern groups are inverted.

Further, in the example shown in FIG. 8, the size of the width B of each of the patterns p1b, p2b, p3b, . . . constituting the first pattern group P2b in the horizontal scanning direction (longitudinal direction) is equal to or greater than that of the width a of one image pixel. The size of the width C of each of the patterns p1c, p2c, p3c, . . . constituting the second pattern group P2c in the horizontal scanning direction (longitudinal direction) is equal to or greater than that of the width a of one image pixel.

FIG. 9 is a block diagram illustrating an example of the configuration of the processing circuit 22' included in the position reading section 12'. In the example of the configuration shown in FIG. 9, the processing circuit 22' includes a differentiating circuit (first differentiating circuit) 412, a differentiating circuit (second differentiating circuit) 413, a comparison circuit (second comparison circuit) 414, a comparison circuit (first comparison circuit) 416 and an EX-OR circuit 417.

The differentiating circuit 412 is connected with the first sensor 21b. The differentiating circuit 412 differentiates a signal (read signal of the first pattern group P2b) input from the first sensor 21b, and outputs the differentiated signal (first differential signal). The differentiating circuit 413 is connected with the second sensor 21c. The differentiating circuit 413 differentiates a signal (read signal of the pattern group P2c) input from the second sensor 21c, and outputs the differentiated signal (second differential signal).

The comparison circuit 414 sets the signal (first differential signal) from the differentiating circuit 412 and the signal (second differential signal) from the differentiating circuit 413 as input signals. The comparison circuit 414 outputs a signal (second binary signal) obtained by comparing and then binarizing the first differential signal and the second differential signal.

Further, the signal (read signal of the first pattern group P2b) from the sensor 21b and the signal (read signal of the second pattern group P2c) from the sensor 21c are also supplied to the comparison circuit 416. The comparison circuit 416 sets the signal (read signal of the first pattern group P2b) from the sensor 21b and the signal (read signal of the second pattern group P2c) from the sensor 21c as the input signals. The comparison circuit 416 outputs a signal (first binary signal) obtained by comparing and then binarizing the read signal of the first pattern group P2b and the read signal of the second pattern group P2c.

The EX-OR circuit 417 is connected with the comparison circuit 414 and the comparison circuit 416. The EX-OR circuit 417 outputs a signal indicating an exclusive OR of the output signal (second binary signal) from the comparison circuit 414 and the output signal (first binary signal) from the comparison circuit 416. The EX-OR circuit 417 outputs an ON signal when only one of the first binary signal and the second binary signal is turned on.

In the position reading section 12', the output signal (read signal of the first pattern group P2b) of the sensor 21b corresponds to the signal S0 shown in FIG. 7B of FIG. 7. Further, the output signal (read signal of the second pattern group P2c) of the sensor 21c corresponds to the signal S01 shown in FIG. 7B of FIG. 7. The differential signal (first differential signal) of the output signal of the sensor 21b corresponds to the signal S02 shown in FIG. 7B of FIG. 7. Further, the differential signal (second differential signal) of the output signal of the sensor 21c corresponds to the signal S03 shown in FIG. 7B of FIG. 7.

According to these correspondence relationships, the comparison circuit 416 of the position reading section 12' outputs the signal corresponding to the first binary signal S1 shown in FIG. 7C of FIG. 7. Further, the comparison circuit 414 outputs the signal corresponding to the second binary signal S2 shown in FIG. 7D. As a result, the EX-OR circuit 417 of the position reading section 12' outputs the signal equivalent to the signal S3 shown in FIG. 7E.

According to the modification described above, the position reading section respectively reads the read signal of the first pattern group and the read signal of the second pattern group serving as an inverted pattern of the first pattern group. The position reading section obtains the signal equivalent to the signal obtained by reading the pattern with the resolution which is twice as much as the resolution at which the pattern is formed actually from the read signal of the first pattern group and the read signal of the second pattern group. As a result, according to the position reading section of the modification, the position detection result corresponding to the read result of the pattern formed at the resolution higher than (resolution twice as much as) the resolution of the pattern for position detection actually formed on the transfer medium.

Furthermore, in the embodiment and the modification described above, it is described that the position reading section reads the pattern for position detection formed by the image forming section. However, the foregoing position reading section may be implemented as a pattern reading apparatus for reading a predetermined pattern (pattern acting as a detection object) other than the pattern for position detection. In other words, the pattern reading apparatus as the position reading section is not limited to being applied to the image forming apparatus. The pattern reading apparatus as the position reading section can be applied as an apparatus for reading a pattern obtained by arranging a plurality of patterns of which widths are a predetermined size at an interval of the predetermined size.

Other than in the operating examples, if any, or where otherwise indicated, all numbers, values and/or expressions referring to parameters, measurements, conditions, etc., used in the specification and claims are to be understood as modified in all instances by the term "about."

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:
1. An image forming apparatus, comprising:
   a conveyance section configured to convey a transfer medium in a predetermined conveyance direction;
   an image forming section configured to form an image of a pattern for position detection obtained by arranging a plurality of patterns of which widths in the predetermined conveyance direction are a predetermined size at an interval of the predetermined size on the transfer medium conveyed by the conveyance section;
   a sensor configured to emit light with a spot diameter having the predetermined size to the pattern for position detection formed on the transfer medium conveyed by the conveyance section, and output a read signal corresponding to reflected light of the emitted light;
   a processing circuit configured to generate a differential signal obtained by differentiating the read signal output by the sensor, and output a signal obtained through an exclusive OR of the read signal and the differential signal obtained by differentiating the read signal; and
   a control section configured to specify a position at which the image forming section forms an image on the basis of the signal output by the processing circuit.
2. The image forming apparatus according to claim 1, wherein the processing circuit comprises a differentiating circuit for differentiating the read signal output by the sensor.

3. The image forming apparatus according to claim 2, wherein
the processing circuit comprises an EX-OR circuit for outputting a signal obtained by calculating the read signal and the differential signal output by the differentiating circuit through the exclusive OR.

4. The image forming apparatus according to claim 3, wherein
the EX-OR circuit outputs an exclusive OR of a first binary signal which is obtained by comparing and then binarizing the read signal and a signal obtained by inverting the read signal and a second binary signal which is obtained by comparing and then binarizing the differential signal obtained by differentiating the read signal and a signal obtained by inverting the differential signal.

5. The image forming apparatus according to claim 1, wherein
the processing circuit comprises a first inverting circuit for outputting the signal obtained by inverting the read signal, a first comparison circuit for outputting the first binary signal obtained by comparing and then binarizing the read signal and the signal output by the first inverting circuit, a second inverting circuit for outputting the signal obtained by inverting the differential signal obtained by differentiating the read signal, a second comparison circuit for outputting the second binary signal obtained by comparing and then binarizing the differential signal and the signal output by the second inverting circuit, and an EX-OR circuit for outputting an exclusive OR of the signal output by the first comparison circuit and the signal output by the second comparison circuit.

6. The image forming apparatus according to claim 1, further comprising
a first sensor configured to emit light to a first reading position on the transfer medium to output a first read signal, and a second sensor configured to emit light to a second reading position which is located on a straight line identical to the first reading position in a direction orthogonal to the predetermined conveyance direction to output a second read signal, wherein
the image forming section forms an image of a pattern for position detection comprising a first pattern group obtained by arranging a plurality of patterns of which widths in the predetermined conveyance direction are a predetermined size at the first reading position at an interval of the predetermined size, and a second pattern group obtained by arranging a plurality of patterns of which widths in the predetermined conveyance direction are a predetermined size at the second reading position at an interval of the predetermined size in an state offset from the first pattern group, and
the processing circuit generates a first binary signal which is obtained by comparing and then binarizing the first read signal and the second read signal and a second binary signal which is obtained by comparing and then binarizing a first differential signal obtained by differentiating the first read signal and a second differential signal obtained by differentiating the second read signal, and outputs a signal obtained through an exclusive OR of the first binary signal and the second binary signal.

7. An image forming apparatus, comprising:
a conveyance section configured to convey a transfer medium in a predetermined conveyance direction;
an image forming section configured to form an image of a pattern for position detection obtained by arranging a plurality of patterns of which widths in the predetermined conveyance direction are a predetermined size at an interval of the predetermined size on the transfer medium conveyed by the conveyance section;
a sensor configured to emit light with a spot diameter serving as the predetermined size to the pattern for position detection formed on the transfer medium conveyed by the conveyance section, and output a read signal corresponding to reflected light of the emitted light; and
a processor configured to carry out differential calculation on the read signal output by the sensor and specify a position at which the image forming section forms the image on the basis of a signal through an exclusive OR of the read signal and a differential signal obtained by carrying out the differential calculation on the read signal.

8. The image forming apparatus according to claim 7, further comprising
a first sensor configured to emit light to a first reading position on the transfer medium to output a first read signal, and a second sensor configured to emit light to a second reading position which is located on a straight line identical to the first reading position in a direction orthogonal to the predetermined conveyance direction to output a second read signal, wherein
the image forming section forms an image of a pattern for position detection comprising a first pattern group obtained by arranging a plurality of patterns of which widths in the predetermined conveyance direction are a predetermined size at the first reading position at an interval of the predetermined size, and a second pattern group obtained by arranging a plurality of patterns of which widths in the predetermined conveyance direction are a predetermined size at the second reading position at an interval of the predetermined size in an state offset from the first pattern group, and
the processor generates a first binary signal which is obtained by comparing and then binarizing the first read signal and the second read signal and a second binary signal which is obtained by comparing and then binarizing a first differential signal obtained by differentiating the first read signal and a second differential signal obtained by differentiating the second read signal, and outputs a signal obtained through an exclusive OR of the first binary signal and the second binary signal.

9. A pattern reading apparatus, comprising:
a sensor configured to emit light with a spot diameter serving as a predetermined size to a pattern acting as a detection target which is located on an object moving in a predetermined conveyance direction, and output a read signal corresponding to reflected light of the emitted light; and
a processing circuit configured to differentiate the read signal output by the sensor, and output a signal obtained through an exclusive OR of the read signal and a signal obtained by differentiating the read signal, wherein
the pattern acting as the detection target is a pattern obtained by arranging a plurality of patterns of which widths in the predetermined conveyance direction are the predetermined size in parallel at an interval of the predetermined size.

10. The pattern reading apparatus according to claim 9, further comprising
a first sensor configured to emit light to a first reading position on the object to output a first read signal, and a second sensor configured to emit light to a second reading position which is located on a straight line identical to the first reading position in a direction orthogonal to the predetermined conveyance direction to output a second read signal, wherein
the pattern acting as the detection target comprises a first pattern group obtained by arranging a plurality of patterns of which widths in the predetermined conveyance direction are a predetermined size at the first reading position at an interval of the predetermined size, and a second pattern group obtained by arranging a plurality of patterns of which widths in the predetermined conveyance direction are a predetermined size at the second reading position at an interval of the predetermined size in an state offset from the first pattern group, and
the processing circuit generates a first binary signal which is obtained by comparing and then binarizing the first read signal and the second read signal and a second binary signal which is obtained by comparing and then binarizing a first differential signal obtained by differentiating the first read signal and a second differential signal obtained by differentiating the second read signal, and outputs a signal obtained through an exclusive OR of the first binary signal and the second binary signal.

11. An image forming method, comprising:
forming an image of a pattern for position detection obtained by arranging a plurality of patterns of which widths in a predetermined conveyance direction are a predetermined size at an interval of the predetermined size on a transfer medium;
emitting light with a spot diameter having the predetermined size to the pattern for position detection formed on the transfer medium, and outputting a read signal corresponding to reflected light of the emitted light;
generating a differential signal obtained by differentiating the read signal, and outputting a signal obtained through an exclusive OR of the read signal and the differential signal obtained by differentiating the read signal; and specifying a position at which an image is formed on the basis of the signal output.

12. The image forming method according to claim 11, wherein
a differentiating circuit is used for differentiating the read signal output.

13. The image forming method according to claim 12, wherein
using an EX-OR circuit for outputting a signal obtained by calculating the read signal and the differential signal output by differentiating through the exclusive OR.

14. The image forming method according to claim 13, wherein
outputting an exclusive OR of a first binary signal which is obtained by comparing and then binarizing the read signal and a signal obtained by inverting the read signal and a second binary signal which is obtained by comparing and then binarizing the differential signal obtained by differentiating the read signal and a signal obtained by inverting the differential signal.

15. The image forming method according to claim 11, further comprising
emitting light to a first reading position on the transfer medium to output a first read signal, and emitting light to a second reading position which is located on a straight line identical to the first reading position in a direction orthogonal to the predetermined conveyance direction to output a second read signal;
forming an image of a pattern for position detection comprising a first pattern group obtained by arranging a plurality of patterns of which widths in the predetermined conveyance direction are a predetermined size at the first reading position at an interval of the predetermined size, and a second pattern group obtained by arranging a plurality of patterns of which widths in the predetermined conveyance direction are a predetermined size at the second reading position at an interval of the predetermined size in an inverted state with the first pattern group; and
generating a first binary signal which is obtained by comparing and then binarizing the first read signal and the second read signal and a second binary signal which is obtained by comparing and then binarizing a first differential signal obtained by differentiating the first read signal and a second differential signal obtained by differentiating the second read signal, and outputting a signal obtained through an exclusive OR of the first binary signal and the second binary signal.

* * * * *